Sept. 30, 1941.   C. E. WILLIAMS   2,257,319
RADIANT ENERGY SYSTEM
Filed June 6, 1936   2 Sheets-Sheet 1

INVENTOR
CHARLES E. WILLIAMS
BY Paul Bliven
ATTORNEY

Sept. 30, 1941.  C. E. WILLIAMS  2,257,319
RADIANT ENERGY SYSTEM
Filed June 6, 1936  2 Sheets-Sheet 2

Inventor
CHARLES E. WILLIAMS
Paul Bliven
By
Attorney

Patented Sept. 30, 1941

2,257,319

UNITED STATES PATENT OFFICE 2,257,319

RADIANT ENERGY SYSTEM

Charles E. Williams, Seattle, Wash.

Application June 6, 1936, Serial No. 83,899

23 Claims. (Cl. 250—11)

My present invention relates to radiant energy systems in which there is a direction indicator for indicating the direction of reception of radiations, and means for orientating the direction indicator so that it will always indicate the new direction resulting from a change in the direction of reception.

My present invention also relates to radiant energy communication systems in which two stations are in relative motion, and in which each station has modulated directional radiators maintained directionally upon the other station, and means for receiving and changing the modulations into perceptible signals.

My present invention also relates to radiant energy systems in which a receiving system actuates a radiating system so that it will radiate in a direction which is a function of the direction of reception by the receiving system.

In the present systems where two stations are in relative motion, the radiators are broadcast radiators without control of the direction of radiation as a function of the direction of the other station.

In my device I am able to maintain two relatively moving stations in communication by mounting at each station a modulated directional radiator and a receiver, which radiator and receiver at each station are in fixed relationship and which have orientating means so constructed that a change in the direction of reception will cause an orientation of the radiator so that it will radiate in the new direction of reception. Thus I am able to establish and maintain secret communication between two relatively moving stations.

It will be seen that one of the objects of my invention is to maintain one or more directional radiators directionally related to reception from a source or sources of radiation, and to indicate the direction of radiation and of reception from the source or sources.

As used herein, a radiant energy direction finder is a direction finder in which a radiant energy receiving device permits a determination of the line of travel of radiant energy as received.

As used herein, a radiant energy directional radiator is a radiator having the property of radiating radiant energy in larger proportions along some directions than others. As used herein, a unidirectional sensed receiving system or a unidirectional sensed radiating system is a radiator or receiver having the property of radiating or receiving radiant energy in larger proportions along a single direction than in any other direction and without 180° ambiguity in that direction.

As used herein, a radiant energy communication system is a system in which intelligence, messages, or effects are transmitted by means of radiant energy.

Figure 1 shows two stations A and B which are maintained in communication by means of the present invention. Like numbers are used to designate like parts in the two stations. Figure 2 is a detailed view of one of the stations of Figure 1.

Figure 1:
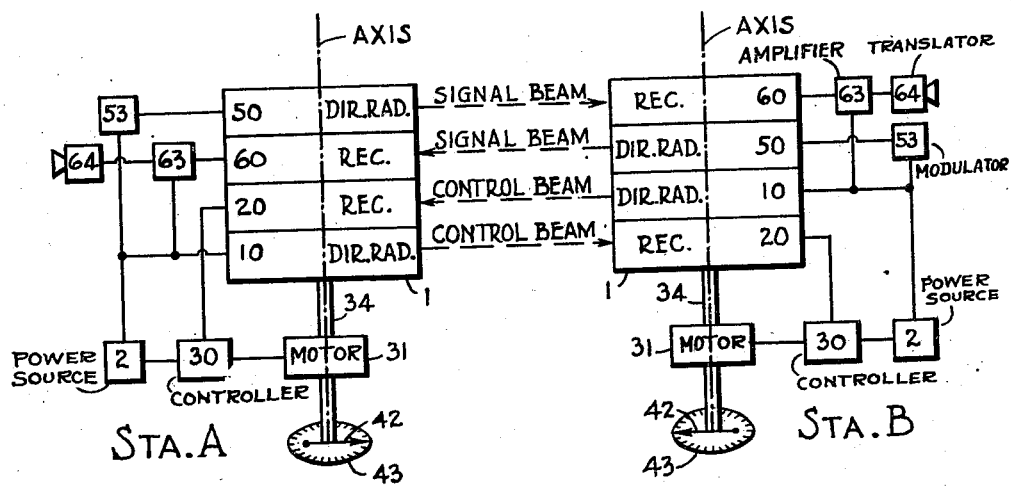
Figure 1 is a schematic assembly of two stations in communication by means of the present invention.

The directional radiators and receivers are mounted in a housing 1. Power is supplied to the various units from the power source 2. In the compartment 10 is a source of radiant energy such as the lamp 11 which derives its power from the source 2. The radiant energy from the lamp 11 is directionalized by the reflector 12 and the lens 13. This radiation is designated as the outgoing control beam.

The compartment 20 and its elements constitute a directional receiver. In the compartment 20 there is a lens 21 which focuses the incoming control radiation, or control beam, upon a photoelectric cell 22. The photo-electric cell has two cathodes 23 and 24, and the anode 25. A shift in the relative direction of the source of the incoming radiation, or beam, will cause more light to fall upon either 23 or 24 and thus effect a differential in the current in one cathode circuit with respect to the other. This differential thru operation of the controller 30, will influence the motion of the motor 31. This motion will be communicated to the compartment 20 through the gear train and shafting 32, 33, 34, 35, and 36. This movement of the compartment 20 is such that it will again be orientated in the direction of the incoming control radiation. The space between the cathodes may be of various values, depending upon the sensitivity desired and the construction limits.

The direction of the source of the incoming control radiation, or beam, is indicated by securing to the shaft 34, by means of gearing 40 and 41, a direction indicator, comprising a pointer 42 and an azimuth scale 43. The housing 1 may act as a direction indicator.

The details of this control system whereby the directional receiver is continuously orientated in the direction of the source of radiation may be much the same as those described in the patent of B. A. Wittkuhns, 1,999,646, granted April 30, 1935.

As shown in Figure 1 the outgoing control beam of one station is the incoming control beam of the other. However, this is not necessarily so, as the outgoing beam might be directed upon another station having an angular, or functional, relationship with respect to the incoming control beam.

The above described apparatus when applied to two stations will allow them to be locked together so that one will remain directed upon the other regardless of the relative motion of the two stations. The direction of the other station, that is, the direction of reception, will be shown by the direction indicator which may be mounted close to the compartments or remotely therefrom as circumstances require. Initially the receiver and the radiator may be directed upon the other station either manually or by permitting the system to hunt until it picks up the other station.

The two stations may be kept in other communication than that afforded by the control beam, by means of a signal radiator mounted in the compartment 50, and the receiver mounted in the compartment 60.

The signal radiator 50 is of the directional type so as to obtain secret communications. It comprises a lens 51, an energy radiator such as the light source 52, and a modulator 53. This modulator may be actuated by telegraph, telephone, or other suitable means. The reflector 54 is similar to reflector 12. The signal receiver 60 is also of the directional type to insure selectivity. It includes lens 61, and a photo-electric cell 62 which is connected to amplifier 63 and translator 64.

For convenience the signal radiator and receiver have been shown as mounted in the housing 1 along with the compartments 10 and 20. However, this is not necessary as they may be separately mounted with interlocking by means of A. C. synchro-motors and A. C. synchro-generators. All that is necessary is that the movement of one control that of the other, that is, that they be functionally related.

The modulated beam may be superimposed upon the outgoing control beam and thus eliminate the use of a separate outgoing signal beam. Also the incoming signal beam may be superimposed upon the incoming control beam and a signal translator placed in the circuit of the photo-electric cell 22.

This system may be used to steer vessels, point guns or steer aeroplanes by connecting various control devices either to the shaft 34 or directly into the controller 30. This connection may be made in any of several well known manners.

Figure 2:
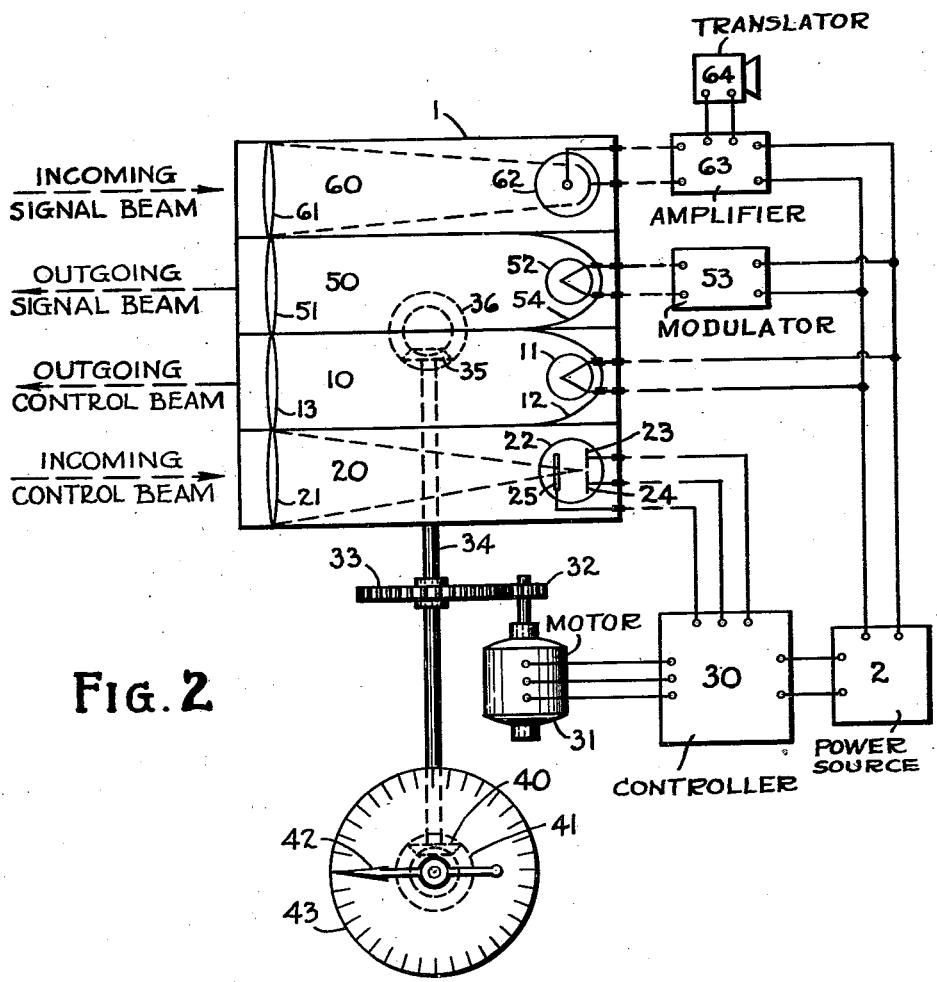
Figure 2 is a detailed view of a single station.

The azimuth scale 43 may indicate either horizontal or vertical direction. The system may be designed to indicate both horizontal and vertical direction at the same time by mounting a four cathode element photo-electric tube in place of the two-cathode one shown at 22. The other cathodes would then be incorporated in an electrical-mechanical circuit similar to that shown in Fig 2. Thus both horizontal and vertical directions would be shown.

If desired the housing 1 may be mounted on gimbals to keep the housing substantially horizontal and unaffected by a ship's rolling. It is also possible to build a system in which the receiver will in fact be a plurality of receivers orientated in different directions, and in which the direction of reception will be indicated without movement of the receiver. In such a system the indicator alone would be orientated. Also such a receiving system might work directly into a radiating system which in fact would be a plurality of directional radiators radiating in different fixed directions, and which radiating system would be so actuated by the receiving system that its direction of radiation by a single radiator would be a function of the direction of reception by said receiving system. Also if the receiver works directly into the radiator which in turn is moved so as to point in the direction of radiation, the radiator may act as the direction indicator. In a radiating system having a plurality of radiators, the orientation, or actuation, is not a physical movement of the radiators but is an electrical selection of the radiator necessary to give radiation in the desired direction.

I do not wish to be restricted to the use of a multiple cathode photo-electric tube. A plurality of two-element photo-electric cells may be adapted to accomplish the same results in a number of ways well known in the art. Likewise it may be desirable to substitute other forms or types of light-sensitive or thermal devices in place of the particular form of cell illustrated and described herein.

I do not wish to be restricted to the use of visible radiation since any of the other well-known radiations may be used. Likewise, I do not wish to be restricted to the use of photo-electric devices since any form of translator which is responsive to the particular radiation employed will accomplish the equivalent or desired result.

Having thus described my invention, I claim:

1. A radiant energy system, comprising: a unidirectionally sensed receiving system; a directional radiating system; and means responsive to variations in the direction of reception by said receiving system from a source of radiant energy remote from and independent of said systems, to so actuate said receiving system that its directional characteristic will coincide with its direction of reception, and to so actuate said radiating system that its direction of radiation will be a function of the direction of reception by said receiving system.

2. A radiant energy system, comprising: a unidirectionally sensed receiving system; a system of directional radiators; and means responsive to variations in the direction of reception by said receiving system from a source of radiant energy remote from and independent of said systems, to so actuate said receiving system that its directional characteristic will coincide with its direction of reception and to actuate said system of directional radiators so that the directions in which radiations are transmitted will be a function of the direction of reception by said receiving system.

3. A radiant energy system comprising: a unidirectional sensed receiving system whose directional characteristic is rotatable without restriction in angular extent, a directional radiating system, and means responsive to variations in the direction of reception by said receiving system from a source of radiant energy remote from and independent of said systems to so actuate said receiving system that its directional characteristic will coincide with the direction of reception and to so actuate said radiating system that its direction of radiation will be a function of the direction of reception by said receiving system.

4. A radiant energy system comprising: a unidirectional sensed receiving system whose directional characteristic is rotatable in three degrees of freedom, a directional radiating system, and means responsive to variations in the direction of reception by said receiving system from a source of radiant energy remote from and independent of said systems to so actuate said receiving system that its directional characteristic will coincide with the direction of reception and to so actuate said radiating system that its direction of radiation will be a function of the direction of reception by said receiving system.

5. A radiant energy system, comprising: a light receiving system, a directional light radiating system, and means responsive to variations in the direction of reception by said receiving system from a source of radiant energy remote from and independent of said systems to so actuate said radiating system that its direction of radiation will be a function of the direction of reception by said receiving system.

6. A radiant energy system, comprising: a directional light receiving system, a directional light radiating system and means responsive to variations in the direction of reception by said receiving system from a source of radiant energy remote from and independent of said systems to so actuate said receiving system that its directional characteristic will coincide with the direction of reception and to so actuate said radiating system that its direction of radiation will be a function of the direction of reception by said receiving system.

7. A radiant energy system, comprising: a first unidirectional sensed receiving system whose directional characteristic is rotatable without restriction, radiating system, and means responsive to variations in the direction of reception by said first receiving system to actuate said receiving system so that its directional characteristic will coincide with the direction of reception and to so actuate said radiating system that its direction of radiation will be a function of the direction of reception by said first receiving system; and a second unidirectional sensed receiving system whose directional characteristic is rotatable without restriction, having associated therewith a direction indicator, and means responsive to variations in the direction of reception by said second receiving system from said first radiating system to so actuate said second receiving system that its directional characteristic will coincide with the direction of reception by said second receiving system and to so orientate said direction indicator that it will indicate the direction of reception by said second receiving system.

8. A radiant energy communication system, comprising: a unidirectional sensed receiving system, a directional radiating system, means responsive to variations in the direction of reception by said receiving system to so actuate said receiving system that its directional characteristic will coincide with the direction of reception and to so actuate said directional radiating system that its direction of radiation will be a function of the direction of reception by said receiving system, and related to said receiving system a translator for translating modulated radiations into perceptible signals.

9. A radiant energy communication system, comprising: a unidirectional sensed receiving system, a directional radiating and modulating system, and means responsive to variations in the direction of reception by said receiving system to so actuate said receiving system that its directional characteristic will coincide with the direction of reception and to so actuate said radiating system that its direction of radiation will be a function of the direction of reception by said receiving system.

10. A radiant energy communication system, comprising: a unidirectional sensed receiving and translating system for receiving and translating modulated radiations into perceptible signals, a directional radiating and modulating system, and means responsive to variations in the direction of reception by said receiving system to so actuate said receiving system that its directional characteristic will coincide with the direction of reception and to so actuate said radiating system that its direction of radiation will be a function of the direction of reception of said receiving system.

11. A radiant energy communication system, comprising: a light receiving and translating system for receiving and translating modulated radiations into perceptible signals, a directional radiating and modulating system, and means responsive to variations in the direction of reception by said receiving system to so actuate said radiating system that its direction of radiation will be a function of the direction of reception of said receiving system.

12. A radiant energy communication system, comprising: a directional light receiving and translating system for receiving and translating modulated radiations into perceptible signals, a directional radiating and modulating system, and means responsive to variations in the direction of reception by said receiving system to so actuate said receiving system that its directional characteristic will coincide with the direction of reception and to so actuate said radiating system that its direction of radiation will be a function of the direction of reception of said receiving system.

13. A radiant energy communication system, comprising: a first unidirectional sensed receiving system; a directional radiating and modulating system; and means responsive to variations in the direction of reception by said receiving system to so actuate said receiving system that its directional characteristic will coincide with the direction of reception and to so actuate said radiating system that its direction of radiation will be a function of the direction of reception by said receiving system; a second receiving system; means responsive to variations in the direction of reception by said second receiving system from said radiating system, to indicate the direction of reception; and means associated with said second receiving system for translating modulated radiations into perceptible signals.

14. A radiant energy system having two stations, said stations comprising: a first station and a second station sensed unidirectional means for directionally receiving and radiating radiations; a first station orientating means responsive to variations in the direction of reception by said first station means for receiving, from said second station means for radiating, to orientate said first station means for receiving and for radiating, in the direction of reception from said second station means for radiating; and a second station orientating means responsive to variations in the direction of reception by said second station means for receiving, from said first station means for radiating, to orientate said second station means for receiving and for radiating, in the direction of reception from said first station means for radiating.

15. A radiant energy system having two stations, said stations comprising: a first station and a second station means for receiving and for directionally radiating light; a first station orientating means responsive to variations in the direction of reception by said first station means for receiving, from said second station means for radiating, to orientate said first station means for radiating, in the direction of reception from said second station means for radiating; a second station orientating means responsive to variations in the direction of reception by said second station means for receiving, from said first station means for radiating, to orientate said second station means for radiating, in the direction of reception from first station means for radiating.

16. A radiant energy system having two stations, said stations comprising: a first station and a second station means for directionally receiving and radiating light; a first station orientating means responsive to variations in the direction of reception by said first station means for receiving, from said second station means for radiating, to orientate said first station means for receiving and radiating, in the direction of reception from said second station means for radiating; and a second station orientating means responsive to variations in the direction of reception by said second station means for receiving, from said first station means for radiating, to orientate said second station means for receiving and radiating, in the direction of reception from said first station means for radiating.

17. A radiant energy communication system, comprising: a unidirectional sensed receiving system, a radiating system, a modulated directional radiator, means responsive to variations in the direction of reception by said receiving system to so actuate said receiving system that its directional characteristic will coincide with the direction of reception and to so actuate said radiating system and said radiator that their directions of radiation will be functions of the direction of reception by said receiving system; and a receiver-translator to permit reception and translation of modulated radiations into perceptible signals.

18. A radiant energy communication system having two stations, said stations comprising: a first station and a second station: sensed unidirectional means for receiving, means for directionally radiating radiations, modulated directional radiator, and receiver-translator; a first station orientating means responsive to variations in the direction of reception by said first station means for receiving, from said second station means for radiating, to orientate said first station means for receiving, means for radiating, and modulated radiator, in the direction of reception from said second station means for radiating; and a second station orientating means responsive to variations in the direction of reception by said second station means for receiving, from said first station means for radiating, to orientate said second station means for receiving, means for radiating, and modulated radiator, in the direction of reception from said first station means for radiating; to permit communication between said stations.

19. A radiant energy communication system having two stations, said stations comprising: a first station and a second station means for unidirectionally sensed receiving, for directionally radiating, and for modulating radiations; a first station orientating means responsive to variations in the direction of reception by said first station means for receiving, from said second station means for radiating, to orientate said first station means for receiving and for radiating, in the direction of reception from said second station means for radiating; a second station orientating means responsive to variations in the direction of reception by said second station means for receiving, from said first station means for radiating, to orientate said second station means for receiving and radiating, in the direction of reception from said first station means for radiating; and related to said first station and second station, means for translating modulated radiations into perceptible signals.

20. A radiant energy communication system having two stations, said stations comprising: a first station and a second station means for receiving light, for directionally radiating light, and for modulating light; a first station orientating means responsive to variations in the direction of reception by said first station means for receiving, from said second station means for radiating, to orientate said first station means for radiating, in the direction of reception from said second station means for radiating; a second station orientating means responsive to variations in the direction of reception by said second station means for receiving, from said first station means for radiating, to orientate said second station means for radiating, in the direction of reception from said first station means for radiating; and related to said first station and second station, means for translating modulated light into perceptible signals.

21. A radiant energy communication system having two stations, said stations comprising: a first station and a second station means for directionally receiving, for directionally radiating, and for modulating light; a first station orientating means responsive to variations in the direction of reception by said first station means for receiving, from said second station means for radiating, to orientate said first station means for receiving and radiating, in the direction of reception from said second station means for radiating; a second station orientating means responsive to variations in the direction of reception by said second station means for receiving, from said first station means for radiating, to orientate said second station means for receiving and radiating, in the direction of reception from said first station means for radiating; and related to said first station and second station, means for translating modulated radiations into perceptible signals.

22. A radio communication system, comprising: a unidirectional sensed radio receiving system, a directional radio transmitting system, and means responsive to variations in the direction of reception by said receiving system to so actuate said receiving system that its directional characteristic will coincide with the direction of reception and to so actuate said transmitting system that its direction of transmission will be a function of the direction of reception by said receiving system.

23. A radio communication system, comprising: a first unidirectional sensed radio receiving system, directional radio transmitting system, and means responsive to variations in the direction of reception by said first receiving system from a second radio transmitting system to so actuate said receiving system that its directional characteristic will coincide with the direction of reception and to so actuate said first transmitting system that its direction of transmission will be a function of the direction of reception by said first receiving system; and a second unidirectional sensed receiving system, directional radio transmitting system, and means responsive to variations in the direction of reception by said second receiving system from said first radio transmitting station to so actuate said second receiving system that its directional characteristic will coincide with the direction of reception and to so actuate said second transmitting system that its direction of transmission will be a function of the direction of reception by said second receiving system.

CHARLES E. WILLIAMS.